4087X
C. & O. Evans.
Plow.
Patented Apr. 14, 1825.
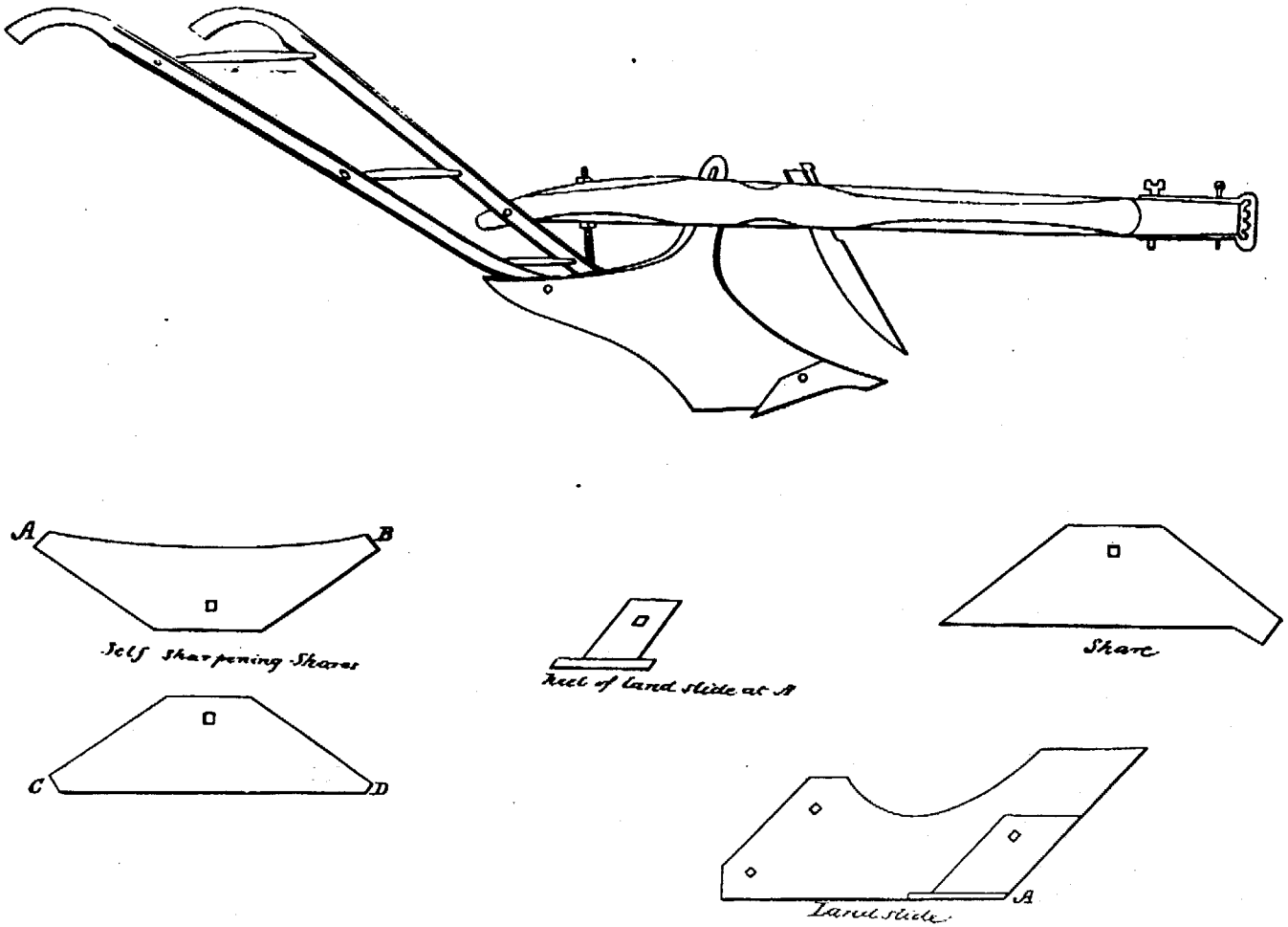
H. PETERS, PHOTO-LITHOGRAPHER, WASHINGTON, D. C.

4087X

UNITED STATES PATENT OFFICE.

CADWALLADER EVANS AND OLIVER EVANS, OF PHILADELPHIA, PA.

SELF-SHARPENING PLOW.

Specification forming part of Letters Patent dated April 14, 1825.

*To all whom it may concern:*

Be it known that we, CADWALLADER EVANS and OLIVER EVANS, of Philadelphia, Pennsylvania, have invented Improvements in Self-Sharpening Plows, of which the following is a specification.

This improvement consists in the form of the share, which is a very simple and effective mode of applying the self-sharpening principle to plows. The share is formed of one entire piece having two points, and is likened in form unto an isosceles triangle, the unequal side constituting the cutting-edge of the share, and the equal sides forming the sides of the share and changing alternately as reversed when applied to the mold-board on a right line with the landside of the plow. The angles formed at the conjunction of the unequal sides with the equal sides are cut off at right angles with the equal sides to a breadth of from three-fourths of an inch to three inches, and form the two points of the share. The angle formed at the junction of the equal sides is cut off, say, one-third the distance of a perpendicular line from the unequal side to the angle, to form the back side of the share and to reduce it to a proper size and weight. The two points of the share act as reversed alternately as the point of the share or as the cutting feather or furrow edge. These points have an additional thickness on the upper side to make them of sufficient strength. The share is beveled equally on each side from the back to a sharp edge at the cutting-edge. The top and bottom of them are alike.

Application: The share is secured to the mold-board of the plow by screw-bolts, and is let in the mold-board from the upper side, so as to form an even continuation of surface with the required shape of the plow. The mold-board is continued under the share to form a support for it to rest on, and comes within one or two inches of the cutting-edge of the share, to admit of the share being reversed until it wears off that distance before the earth coming in contact with the under part of the mold-board. The share, by its friction on the earth, becomes dull, the screw-bolts are reversed, and the share reversed upside down, so that its operation on the earth will tend to resharpen it. By these means the share is always kept in good working order.

The advantages of this invention are the simple structure of the share and the facility with which the parts can be made either of wrought or cast iron, and the efficient operation of the self-sharpening principle.

This share can be made concave on the cutting-edge, and may be secured on the under part of the mold-board. We have found by practical experiment that the angles at the joining of the equal sides of the share with the unequal side or cutting-edge should be about sixty degrees or sixty-five degrees.

A self-sharpening share can be made of one piece and secured on the under part of the mold-board.

CADWALLADER EVANS.
OLIVER EVANS.

Witnesses:
TH. FRANCIS,
HUGH JONES.